(12) United States Patent
Moudgill et al.

(10) Patent No.: US 11,650,817 B2
(45) Date of Patent: May 16, 2023

(54) SYSTEM AND METHOD TO IMPLEMENT MASKED VECTOR INSTRUCTIONS

(71) Applicant: Optimum Semiconductor Technologies Inc., Tarrytown, NY (US)

(72) Inventors: Mayan Moudgill, Chappaqua, NY (US); Murugappan Senthilvelan, Fanwood, NJ (US)

(73) Assignee: Optimum Semiconductor Technologies Inc., Tarrytown, NY (US)

( * ) Notice: Subject to any disclaimer, the term of this patent is extended or adjusted under 35 U.S.C. 154(b) by 0 days.

(21) Appl. No.: 17/276,598

(22) PCT Filed: Sep. 18, 2019

(86) PCT No.: PCT/US2019/051637
§ 371 (c)(1),
(2) Date: Mar. 16, 2021

(87) PCT Pub. No.: WO2020/061139
PCT Pub. Date: Mar. 26, 2020

(65) Prior Publication Data
US 2022/0179653 A1 Jun. 9, 2022

Related U.S. Application Data

(60) Provisional application No. 62/732,638, filed on Sep. 18, 2018.

(51) Int. Cl.
*G06F 9/30* (2018.01)
(52) U.S. Cl.
CPC ........ *G06F 9/30036* (2013.01); *G06F 9/3013* (2013.01); *G06F 9/30018* (2013.01)

(58) Field of Classification Search
CPC . G06F 9/30036; G06F 9/30018; G06F 9/3013
See application file for complete search history.

(56) References Cited

U.S. PATENT DOCUMENTS

| 5,903,769 A | 5/1999 | Arya |
| 2009/0240920 A1 | 9/2009 | Muff et al. |

(Continued)

OTHER PUBLICATIONS

International Application No. PCT/US2019/051637, International Search Report and Written Opinion dated Dec. 30, 2019, 8 pages.

(Continued)

*Primary Examiner* — Zachary K Huson
(74) *Attorney, Agent, or Firm* — Zhong Law, LLC (57) ABSTRACT

A processor includes a register file comprising a length register, a vector register file comprising a plurality of vector registers, a mask register file comprising a plurality of mask registers, and a vector instruction execution circuit to execute a masked vector instruction comprising a first length register identifier representing the length register, a first vector register identifier representing a first vector register of the vector register file, and a first mask register identifier representing a first mask register of the mask register file, wherein the length register is to store a length value representing a number of operations to be applied to data elements stored in the first vector register, the first mask register is to store a plurality of mask bits, and a first mask bit of the plurality of mask bits determines whether a corresponding first one of the operations causes an effect.

28 Claims, 2 Drawing Sheets

(56) References Cited

U.S. PATENT DOCUMENTS

| | | |
|---|---|---|
| 2014/0040597 A1 | 2/2014 | Fleischer et al. |
| 2014/0095830 A1* | 4/2014 | Plotnikov ........... G06F 9/30072 |
| | | 712/E9.034 |
| 2015/0095623 A1* | 4/2015 | Ermolaev ........... G06F 9/30036 |
| | | 712/222 |
| 2015/0254077 A1* | 9/2015 | Boettcher ........... G06F 9/30072 |
| | | 712/4 |
| 2016/0224513 A1 | 8/2016 | Moudgill et al. |
| 2016/0299763 A1 | 10/2016 | Hughes et al. |
| 2017/0052785 A1 | 2/2017 | Uliel et al. |
| 2017/0109167 A1* | 4/2017 | Eisen .................. G06F 9/30072 |
| 2019/0004801 A1* | 1/2019 | Haber ................. G06F 9/30032 |

OTHER PUBLICATIONS

Espasa et al., "Tarantula: A Vector Extension to the Aplha Architecture," IEEE, 2002, pp. 1-12.
European Application No. EP19863069, Extended European Search Report dated May 18, 2022, 12 pages.

* cited by examiner

SYSTEM AND METHOD TO IMPLEMENT MASKED VECTOR INSTRUCTIONS

CROSS-REFERENCE TO RELATED APPLICATIONS

This application is a national stage application of PCT/US2019/051637 filed Sep. 18, 2019, which claims priority to U.S. provisional application 62/732,638 filed Sep. 18, 2018. The contents of the above-mentioned applications are hereby incorporated by reference in their entireties.

TECHNICAL FIELD

The present disclosure relates to computer processors, and in particular, to processors that support vector instructions including masked vector instructions.

BACKGROUND

A vector processor (also known as array processor) is a hardware processing device (e.g., a central processing unit (CPU) or a graphic processing unit (GPU)) that implements an instruction set architecture (ISA) containing vector instructions operating on vectors of data elements. A vector is a one-directional array containing ordered scalar data elements. As a comparison, a scalar instruction operates on singular data elements. By operating on vectors containing multiple data elements, vector processors may achieve significant performance improvements over scalar processors that supports scalar instructions operating on singular data elements.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

A vector instruction of a hardware processor is an instruction that performs operations on vectors containing more than one elements of a certain data type. The input and output data can be stored in one or more vector registers associated with the processor. These vector registers are storage units that are designed to hold the multiple data elements of the vectors.

Exemplary vector instructions include the streaming single instruction multiple data extension (SSE) instructions used by the x86 instruction set architecture (ISA). Some implementations of ISA may support variable-length vector instructions. A variable-length vector instruction includes a register identifier that specifies a register storing the number of elements of the vector to be processed by the instruction. The register in the variable-length vector instruction is called vector-length register.

Vector instructions in certain application domain such as graphics shaders may need to implement mechanism for suppressing the effects of elements at certain positions within the vector (known as masking). The occurrences of masking may be based on the results of certain conditional statement (e.g., "IF," "ELSE," and "END-IF"). In some situations, the conditions can be nested. Correspondingly, the masking can also be nested.

In programming of graphic processing unit (GPU) and general-purpose computing on graphic processing unit (GPGPU), the application code to be executed usually may include straight-line code with an implicit FOR-ALL-ITEMS wrapped around it. The data items can variously be vertices, fragments, or work-items of a graphic model depending upon the purpose of the application.

The application code can be readily converted to a set of vector operations. Each vector operation performs a specific operation on multiple sets of inputs. A vector operation is also referred to as a vector instruction.

For example, a line of code that is applicable for all items can be:

For-all-Items $z=x+y$ this code can be converted to a vector instruction:

vadd_w $n,$vz,$vx,$vy where vadd_w is a mask-less vector add instruction operating on 32-bit words, $n is the vector length register containing the number of items, $vx and $vy are the input vector registers containing values of x and y, and $vz is the target vector register containing output values of z. Although it is possible that the number of items cannot fit into a single vector instruction, for concise description, it is assumed that the maximum vector length is large enough so that all operations can be converted to a single vector instruction.

The semantics of the vadd_w instruction corresponds to:
for (i=0; i<$n; i++)
$vy[i]=$vx[i]+$vy[i]

However, if there are conditional statements within the loop kernel, then to effectively convert these loop kernels to vector operations, there is a need for the capability to selectively perform the specified operation for the indices that satisfy the condition.

An example of conditional vector operations is as follows:

FOR-ALL-ITEMS
  if( z == 0 )
    z = x + y
  endif In the above example, the value of z is set to x+y only if z is equal to 0. A mask register may be used to convert this loop kernel to vector operations. The mask bits stored in the mask register may represent the condition (whether z is equal to 0), where the mask bits may be set up based on whether the condition is true or false, and the corresponding operations with respect to an element are executed only if the condition is true. With this capability, the loop kernel above would be converted to:

vcmp_eq $n,$m,$vz,$v0 vaddm_w $n,$vz,$vx,$vy,$m where vcmp_eq is a vector compare instruction that checks for the condition of whether z is equal to 0 and sets up mask bits in a mask register ($m), vaddm_w is a masked vector add instruction that performs the add operation for an element only if the corresponding mask bit=1, where elements with mask bit=0 are left unchanged; $n is the vector length register containing the number of data elements in each of the input vectors and correspondingly, the number of mask bits; $m is the vector mask register containing mask bits, where the value of 0 represents that the condition is false ("False") and the value of 1 represents that the condition is true ("True"); $vx, $vy, $vz are the vector registers containing values of x, y, and z, respectively; $v0 is the vector register with all elements being set to 0.

Thus, a masked vector instruction may be executed to perform the specified operation on the input vectors based on a condition specified by the mask values provided in the mask register. The semantics of the vaddm_w instruction can be translated to:

```
for( i = 0; i < $n; i++ )
    if( $m[i] )
        $vz[i] = $vx[i] + $vy[i]
```

In some implementations, the mask may suppress all related operations associated with the data element being masked. Apart from preventing the target register value from getting overwritten, masking of the $i^{th}$ index may also suppress any changes to state registers such as floating-point status registers and prevent any exceptions from being triggered.

In some implementations, the loop kernels may include a cascade of conditions. An example of a cascade of conditions is as follows:

```
FOR-ALL-ITEMS
    if( x > 0 )              - target mask register m1
        z = x                - to be executed only if m1 is true
    else if( x < 0 )         - target mask register m2
        z = y                - to be executed only if m2 is true
    else                     - if x == 0; target register m3
        z = z                - to be executed only if m3 is true
    endif
```

The above source code may be converted into the following machine instructions:

```
vcmp_gt      $n,$m1,$vx,$v0
vcopym_w     $n,$vz,$vy,$m1
vcmp_lt      $n,$m2,$vx,$v0
vcopym_w     $n,$vz,$vx,$m2
vcmp_eq      $n,$m3,$vx,$v0
vaddm_w      $n,$vz,$vx,$vy,$m3
```

As shown above, this code is implemented without hardware stacks. In some implementations, the loop kernels may include nested conditions. An example of nested conditions is as follows:

```
FOR-ALL-ITEMS
    if( z > t1 )             - target mask register m1
        if( z > t2 )         - target mask register m2
            z = z - t2       - to be executed only if m1 & m2 = 1
        else
            z = z + 1        - to be executed only if m1 & !m2 = 1
        endif
    endif
FOR-ALL-ITEMS
    if( z > t1 )             - target mask register m1
        if( z > t2 )         - target mask register m2
```

-continued

```
        if( z > t3 )         - target mask register m3
            z = z - t3       - to be executed only if m1 & m2 &
        m3 = 1
        else
            z = z + 1        - to be executed only if m1 & m2 &
        !m3 = 1
        endif
    else
        if( z > t4 )         - target mask register m4
            z = z - t4       - to be executed only if m1 & !m2 &
        m4 = 1
        else
            z = z + 1        - to be executed only if m1 & !m2 &
        !m4 = 1
        endif
    endif
endif
```

As seen in the above example, the conditions may be nested in multiple layers. Mask registers (e.g., $m1-$m4) are referred to as the generated mask registers because the values of these mask registers are set based on the condition statements in the source code. A final mask register (e.g., $m0) may be employed to store the combined (through AND (&) operations) values of the generated mask registers. As the nesting of the condition ("if") statements get deeper, the number of mask registers and the number of operations to compute the final mask increases linearly. Using the same technique, the number of read ports for the mask register file and the number of instructions needed to derive the final mask also increase linearly. Thus, the current approach to handling masked vector instructions is not efficient and does not scale well.

Thus, current implementations often use a dedicated hardware implementation to supported nested ifs. One implementation technique is to maintain two stacks of masks including a generated stack and a final stack:

Initially
  the generated stack is empty
  the final stack contains one entry, a mask of all 1s.
When a new if is encountered,
  the mask corresponding to the condition is pushed onto the generated stack
  the mask is processed using an AND operator with the mask at the top of the final stack and the result is pushed onto the final stack
When an else is encountered
  the final stack is popped
  the new top of the final stack is operated with the AND operator with the complement of the mask at the top of the generated stack and the result is pushed back onto the summary stack.
When an endif is encountered, both stacks are popped
When a masked operation is used, it is masked using the mask at the top of the final stack.

The dedicated hardware stack implementation suffers from several deficiencies:
  Only nested ifs are handled; other structures, such as a cascade of ifs may need to be converted into a nested if form before being used,
  Only the mask at the top of the hardware stack can be used for masking. This means that it is not possible to reorder operations that use different masks. This can lead to suboptimal instruction ordering.
  The dedicated hardware stack is more complex to implement than a register of masks.

To overcome the above-identified and other deficiencies in current approach to handling masked vector, implementations of present disclosure provide a processor architecture and method that implement masking of vector operations. To this end, implementations provides the following:
- an array of mask registers,
- vector operations that are masked based on the bits in a mask register,
- vector operations that compare the values of vector registers and set mask registers,
- vector compare operations that are themselves masked based on the bits in a mask register,
- instructions to manipulate masked registers, and
- a means to transfer masked registers to and from memory.

The instructions to manipulate masked registers for vector registers may include instructions of the form VMOP $mt, $ma, $mb, where each bit in $mt is set to a Boolean combination of the corresponding bits of $ma and $mb. The Boolean combinations may minimally include AND operation (i.e. x & y) as well as AND-complement (i.e. x & not y), though other combinations are useful as well. It is also helpful to specify an operation VMINV $mt, $ma that sets each bit in $mt to the bit-wise complement of the corresponding bit in $ma.

The following is an example of source code and its corresponding processor instructions generated by the compiler. The give source code is:

```
...
FOR_ALL_ITEMS
    if( x > 0 )
        if( y > 0 )
            z = x-y
            if( z < 0 )
                z = 0
            endif
        else
            z = x+y
        endif
        z = z+z
    else
        z = y
    endif
```

Assuming that all items fit in a single register, where x, y, z in $vx, $vy, $vz, $v0 holds all 0s using explicit masks, the corresponding processor instructions are:

```
                                    # if( x > 0 )
vcmp_gt  $n,$m1,$vx,$v0             # the x comparison is unmasked
                                    # in terms of the "mask stack"
                                    # corresponding to
                                    # "pushed" $m1 onto the stack, and it
                                    # is also the final mask
                                    # if( y > 0 )
vcmpm_gt $n,$m2,$vy,$v0,$m1         # the y comparison is masked with $m1
                                    # in terms of the "mask stack",
                                    # corresponding to
                                    # "pushed" $m2 onto the stack,
vand     $n,$m3,$m1,$m2             # $m3 is the final mask
                                    # of the contents of mask stack,
                                    # $m1 AND $m2
                                    # The final mask stack holds $m3,$m1
                                    # The generated mask stack hold $m2,$m1
                                    # z = x-y
vsubm    $n,$vz,$vx,$vy,$m3         # masked with final $m3
                                    # if( z < 0 )
vcmpm_lt $n,$m4,$vz,$v0,$m3         # $m4 is now "pushed" onto the
                                    # "generated
                                    # mask stack", which holds $m4,$m2,$m1
vand     $n,$m5,$m3,$m4             # and $m5 is the final mask, so the
                                    # "final mask stack" holds $m5,$m3,$m1
                                    # z = 0
vcopy    $n,$vz,$v0,$m5             # endif
                                    # $m4 is now no longer used; it is
                                    # "popped" from the stack, and $m3 is
                                    # the final mask; the "generated stack"
                                    # is $m2,$m1 and the "final stack" is
                                    # $m3,$m1
                                    # else
                                    # $m3 is also no longer used; it can be
                                    # popped, so final stack is $m1
vand_inv $n,$m3,$m1,$m2             # we reuse $m3 to hold the final
                                    # mask for the else branch
                                    # $m1 AND NOT $m2
                                    # final stack is now $m3,$m1
                                    # generated stack is $m2,$m1
                                    # z = x+y
vaddm    $n,$vz,$vx,$vy
                                    # endif
                                    # $m3 is "popped" as is $m2.
                                    # both stacks are $m1
                                    # z = z+z
vaddm    $n,$vz,$vz,$vz             # $m1 is final mask
                                    # else
```

-continued

| | | |
|---|---|---|
| vinv $n,$m2,$m1 | | # pop $m1 from the final stack.<br># and generate the final mask for<br># the else branch, NOT $m1<br># $m2 is now the final mask and is<br># is "pushed" onto the final stack |
| vcopym $n,$vz,$vy,$m2 | | |

If the mask register used for masking is fixed, say to 0, then variations of mask may be needed to combine operations (i.e. vand, vand_inv, vinv above) that write their results to two mask registers including $m0 and another one. The code above can be rewritten as:

| | | |
|---|---|---|
| vcmp_gt | $n,$m1,$vx,$v0 | |
| vmcopy | $n,$m0,$m1 | # $m0 must be made final |
| vcmpm_gt | $n,$m2,$vy,$v0 | |
| vand | $n,$m0,$m3,$m1,$m2 | # write to both $m0 and $m3 |
| vsubm | $n,$vz,$vx,$vy | |
| vcmpm_lt | $n,$m4,$vz,$v0 | |
| vand | $n,$m0,$m5,$m3,$m4 | # write to both $m0 and $m5 |
| vcopy | $n,$vz,$v0,$m5 | |
| vand_inv | $n,$m0,$m3,$m1,$m2 | # write to both $m0 and $m3 |
| vaddm | $n,$vz,$vx,$vy | |
| vinv | $n,$m0,$m1 | # in this case, we don't need to |
| write to | | |
| | | # $m2 as well. |
| vcopyj | $n,$vz,$vx,$vy | |

In one implementation, each vector instruction that is masked names a mask register to store the final result.

In another implementation, some or all masked vector instructions may use a specific mask register. In such implementations, it is beneficial to have mask manipulation operations that set two mask registers to the same value. So, VMOP2 $mt1,$mt2,$ma,$mb sets each bit in mask registers $mt1 and $mt2 to the bitwise combination of the corresponding bits of $ma and $mb. Similarly, VMINV $mt1, $mt2,$ma sets each bit in $mt1 and in $mt2 to the bit-wise complement of the corresponding bit in $ma.

The following sections describe how the function of the hardware based stack implementation can be emulated using the masked register approach described above. The generated code will use mask registers to keep track of the masks used by the hardware stack-based implementation. Both masks that would be in the final stack and the generated masks are kept in the mask registers.

Implementations of the disclosure may be achieved by a software component (e.g., the compiler) and hardware components (e.g., mask manipulation instructions). Further, the processor may maintain a first list of mask registers for tracking the generated masks (corresponding to as the "generated mask stack") and a second list of mask registers for tracking the final masks (referred to as the "final mask stack"). Since the compiler parses the source code of the application program and converts the source code to processor instructions including vector instructions, the compiler may determine the levels of nesting and based on the level of nesting to maintain the generated mask stack and the final mask stack. Each element in the stacks can be individually identified mask registers. The compiler should be able to identify the mask registers for computing the final mask.

Figure 1:
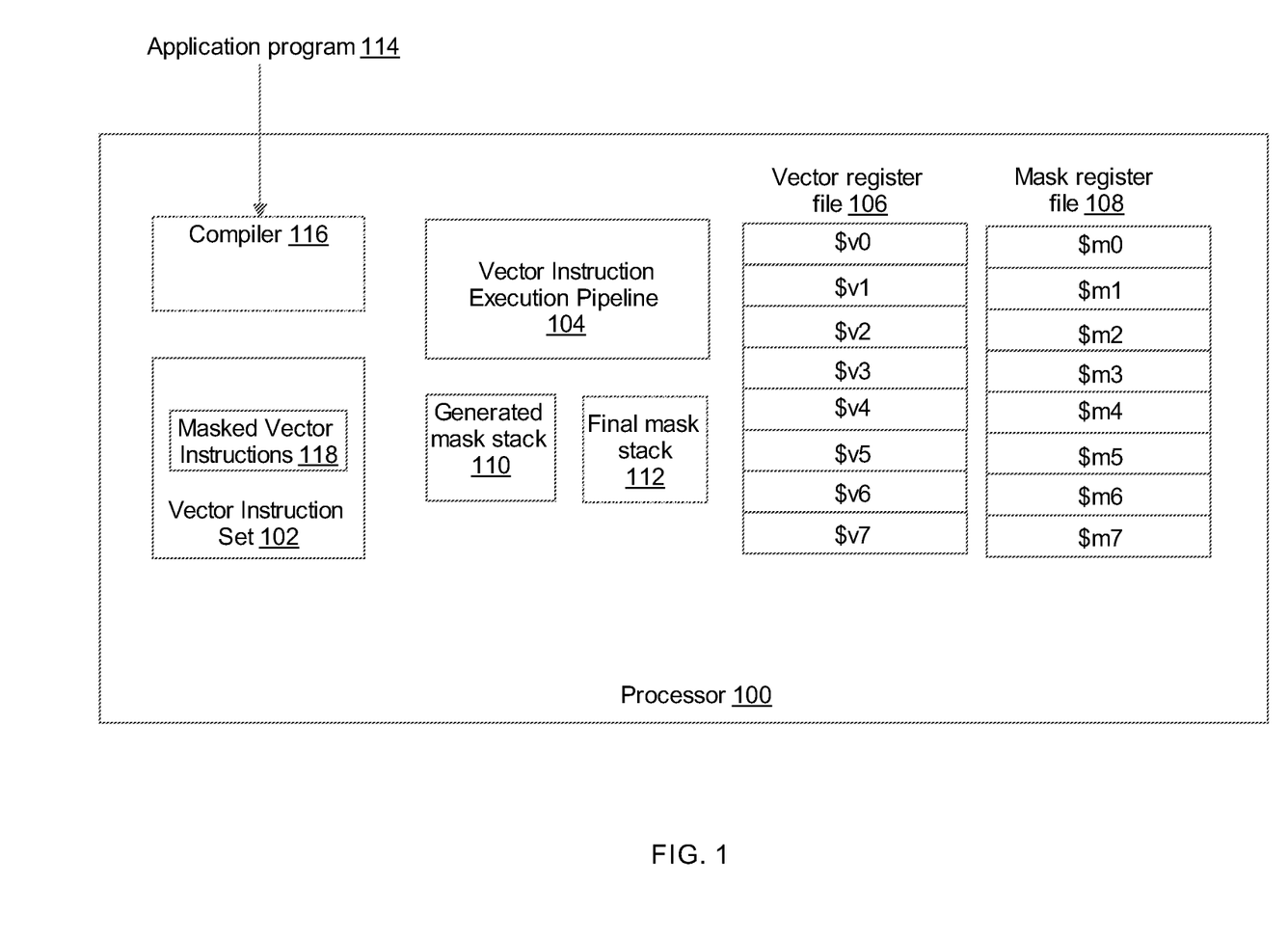
FIG. 1 illustrates a hardware processor including masked vector instructions according to an implementation of the present disclosure.

FIG. 1 illustrates a hardware processor 100 including masked vector instructions according to an implementation of the present disclosure. Processor 100 can be a central processing unit (CPU), a processing core of the CPU, a graphic processing unit (GPU), or any suitable types of processing device. As shown in FIG. 1, processor 100 may include vector instruction execution pipeline 104, a vector register file 106, a mask register file 108. Processor 100 may include circuits implementing masked vector instructions 118 and other instructions specified according to a vector instruction set architecture 102, where the masked vector instructions 118 may include variable-length vector instructions and fixed-length vector instructions. The variable-length vector instructions include an identifier of a length register that specifies the number of operations on elements of a vector; the fixed-length vector instruction operates a pre-determined fixed number of operations. The vector instruction execution pipeline 104 may include an instruction fetch stage, an instruction decode and register read stage, an instruction execute stage, and an instruction writeback stage. Each stage of vector instruction execution pipeline 104 may process separate micro-ops of one or more vector instructions. The instructions are moved through vector instruction execution pipeline 104 based on clock cycles.

In one implementation, processor 100 may support a compiler 116, a generated mask stack 110, and a final mask stack 112. Compiler 116 may include executable code what, when executed, convert the source code of a program into processor instructions such as, for example, masked vector instructions 118 specified by vector instruction set 102. A stack is a linear data structure that follows a particular order to store and access data items in the data structure. For example, the data items in a stack can be accessed as a first-in-first-out (FIFO) order or a last-in-first-out (LIFO) order. In one implementation, generated mask stack 110 and final mask stack 112 may be implemented using general purpose registers or using the memory accessible by processor 100. Generated mask stack 110 may store an ordered list of identifiers representing the generated mask registers; final mask stack 112 may store an ordered list of final mask registers. Implementations of the disclosure employ generated mask stack 110 and final mask stack 112 to track generated mask registers and final mask registers.

Figure 2:
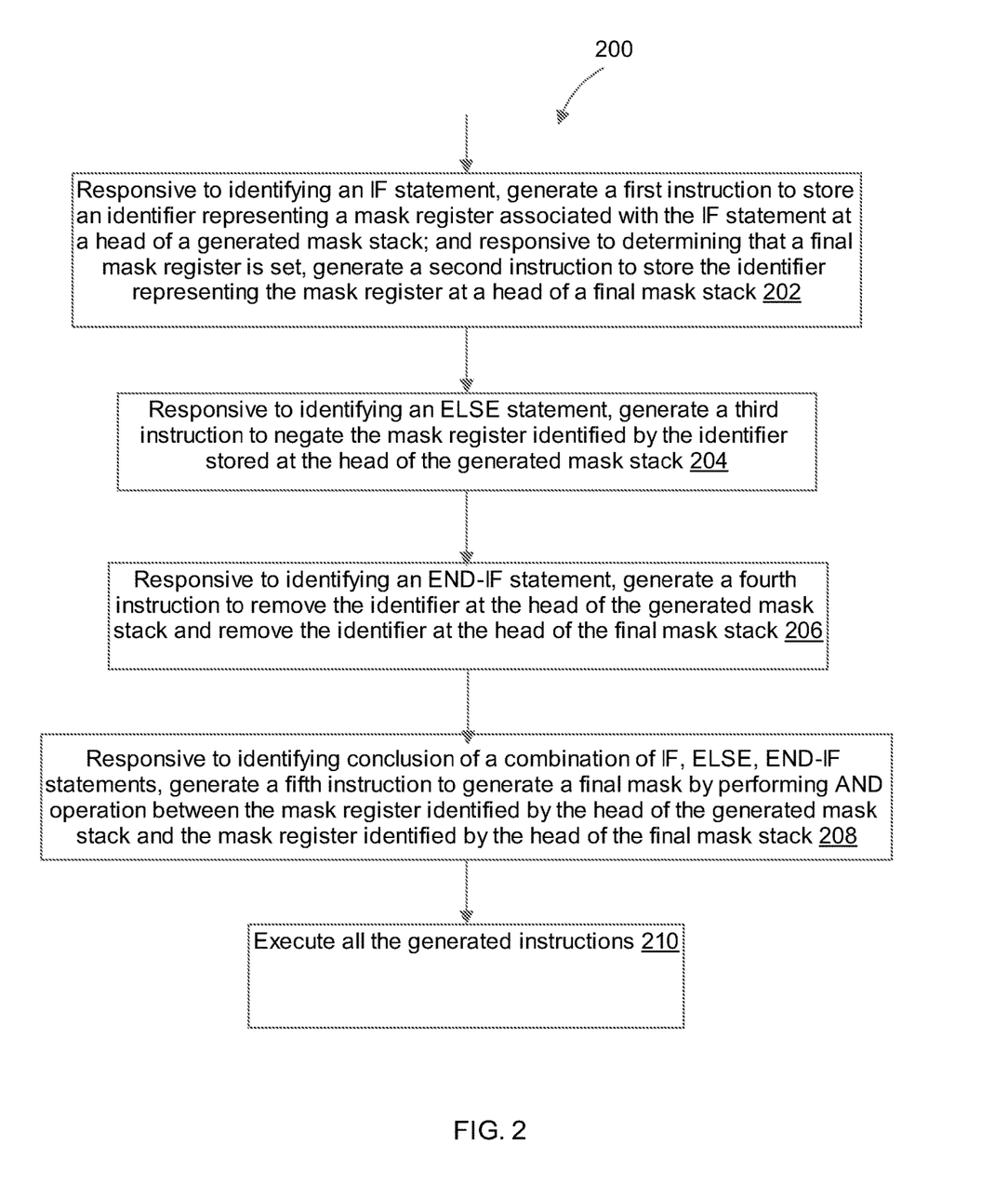
FIG. 2 illustrates a flowchart of a method to manage mask registers according to an implementation of the disclosure.

The processing device may execute a compiler that reads the source code of a program and identify condition statements (e.g., IF, ELSE, END-IF) and generate processor instructions including masked vector instructions 118. The processing device may further update the generated mask stack and the final mask stack based on the identified conditional statements. FIG. 2 illustrates a flowchart of a method 200 to manage mask registers according to an implementation of the disclosure. Method 200 may be performed by processing devices that may comprise hardware (e.g., circuitry, dedicated logic), computer readable instructions (e.g., run on a general purpose computer system or a dedicated machine), or a combination of both. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by processor 100 executing compiler 116 and masked vector instructions generated by compiler 116 as shown in FIG. 1.

Compiler 116 may receive and read source code of an application program which may contain conditional statements. Conditional statements may include IF, ELSE, and END-IF statements. Further, conditional statements can be compounded as nested conditional statements. As shown in FIG. 2, responsive to identifying an IF statement in the source code, at 202, processor 100 may execute the compiler 116 to generate a first masked vector instruction that, when executed, stores an identifier representing a mask register associated with the IF statement at a head position of generated mask stack 110; and responsive to determining that final mask register had previously been set, processor 100 may execute compiler 116 to generate a second masked vector instruction that, when executed, stores the identifier representing the mask register at a head position of the final mask stack 112. Storing the identifier at the head positions of generated mask stack 110 and at the head position of final mask stack 112 may include pushing identifiers already stored in the stacks down one position.

Responsive to identifying an ELSE statement, at 204, processor 110 may execute compiler 116 to generate a third masked vector instruction that, when executed, negates the value stored in the mask register identified by the identifier stored at the head position of the generated mask stack 110.

Responsive to identifying an END-IF statement, at 206 processor 100 may execute compiler 116 to generate a fourth masked vector instruction that, when executed, removes the identifier stored at the head position of generated mask stack 110 and remove the identifier stored at the head position of final mask stack 112. The removal of the identifiers from generated mask stack 110 and final mask stack 112 may include moving identifiers already stored in the stacks up one position.

Responsive to identifying conclusion of a combination of IF, ELSE, END-IF statements, at 208, processor 100 may execute compiler 116 to generate a fifth masked vector instruction that, when executed, generates a final mask by performing an AND operation between the mask register identified by the head position of generated mask stack 110 and the mask register identified by the head position of final mask register 112. Masked vector instructions may execute operations on vector elements that are not masked by the final mask.

At 210, processor 100 may execute the masked vector instructions generated by compiler 116.

Following Table 1 illustrates an example of the management by the compiler of generated mask stack and the final mask stack.

TABLE 1

| Source Code | Generated Mask Bits | Generated Mask Stack | Final Mask Stack | Final Mask |
|---|---|---|---|---|
| if( z > t1 ) | m1 | m1 | | |
| | | | | m1 |
| if( z > t2 ) | m2 | m2, m1 | m1 | |
| | | | | m2&m1 |
| if( z > t3 ) | m3 | m3, m2, m1 | m2&m1, m1 | |
| z = z − t3 | | | | m3&m2&m1 |
| Else | | !m3, m2, m1 | m2&m1, m1 | |
| z = z + 1 | | | | !m3&m2&m1 |
| Endif | | m2, m1 | m1 | |
| | | | | m2&m1 |
| Else | | !m2, m1 | m1 | |
| | | | | !m2&m1 |
| if( z > t4 ) | m4 | m4, !m2, m1 | !m2&m1, m1 | |
| z = z − t4 | | | | m4&!m2&m1 |
| Else | | !m4, !m2, m1 | !m2&m1, m1 | |
| z = z + 1 | | | | !m4&!m2&m1 |
| Endif | | !m2, m1 | | |
| | | | | !m2&m1 |
| Endif | | m1 | | |
| | | | | m1 |
| Endif | | | | |

In one implementation, mask register file 108 may include eight mask registers $m0-$m7, where $m0 is reserved for mask vector operations while mask registers $m1 to m7 are available to the compiler to be used as identifiers in generated mask stack 108 (e.g., $m1 to $m4) and as identifiers in final mask stack 110 (e.g., $m5 to $m7). Thus, with the eight mask registers, compiler 116 may handle up to four levels of nesting. For nesting that is deeper than four levels, the compiler may employ the memory to create virtual mask registers and restore these virtual mask registers when necessary.

The compiler is responsible for generating instruction that may be used to manage the generated mask stack and final mask stack as described above. Implementations of the disclosure also provide hardware support to support the management of mask registers. The hardware support may include certain mask vector instructions 118 specified in vector instruction set 102.

In one implementation, vector instruction set 102 may specify a masked vector compare instruction ("VCMPM"). The masked vector compare instruction ("VCMPM") may compare to vector registers and sets up a target mask register.

vcmpm_op $n,$mt,$vx,$vy where op is a comparison operation such as equal, greater than, etc. This instruction may have semantics:

```
for(i = 0; i < n; i++ )
    if(m0[i])
        mt[i] = vx[i] op vy[i]
```

Note that this instruction itself is implemented as a masked vector instruction. This implementation may ensure that unintended exceptions are not triggered. The exception can include an IEEE floating point invalid exception that can occur if the comparison is a floating point comparison in which either of the two arguments is invalid.

In one implementation, vector instruction set 102 may specify vector set mask instruction ("VSETM") that may write the AND results of two mask registers into two target vector mask registers including a first target mask register used by the vector mask instruction and a second target mask register used to save the value for future use.

vsetm$n,$mt,$ma,$mb where vsetm may perform an AND operation on each element of $ma and $mb and write the results to $mt and, by default, to $m0. The semantics of this instruction is:

```
for( i = 0; i < n; i++ )
    mt[i] = ma[i] & mb[i]
    m0[i] = ma[i] & mb[i]
```

Note that execution of vsetm may cause to write to both a specified target register $mt and to $m0 because $m0 is implicitly specified as the second target mask register used as the execution mask for all masked vector instructions.

In another implementation, vector instruction set 102 may specify a vector invert mask register ("VINVM") that may write the AND results of one mask register and an inverse of another mask register into two target vector mask registers including a first target mask register used by the vector mask instruction and a second mask register used to save the value for future use.

vinvm$n,$mt,$ma,$mb where vinvm may perform an AND operation on each element of $ma and !$mb and write the results to $mt and, by default, to $m0. The semantics of this instruction is:

```
for( i = 0; i < n; i++ )
    mt[i] = ma[i] & !mb[i]
    m0[i] = ma[i] & !mb[i]
```

Note that execution of vinvm may cause to write to both a specified target register $mt and to $m0 because $m0 is implicitly specified as the second target mask register used as the execution mask for all masked vector instructions.

In one implementation, vsetm and vinvm may be combined into a single vector instruction which may include a flag indicating whether the instruction is to perform vsetm operations or vinvm operations.

Appendix A illustrates an example usage of these vector instructions used to support a compiler to manage mask registers and the associated generated mask stack final mask stack.

In some implementations, the data elements of a vector can include a composite type data items rather than only scalar type of data items. For example, the data element can be an ivec4 type which is a vector containing four integer values. An example usage of ivec4 type is as follows:

```
ivec4 x,y,z;
FOR-ALL-ITEMS
    z = x + y
```

One method to vectorize this is to treat the composite values as being composed of scalar values, and then vectorize the scalar equivalents. This approach may expand the composite values into scalar values, and perform masked vector operations on the scalar data elements as described above. Another implementation may include mask vector instructions that operates on the composite values directly. In this implementation, each vector register may be employed to hold an array of ivec4 data elements, instead of an array of scalar data elements. This means that a vector may hold 4 times of the number of integer scalar values. An example of vector instruction is as follows:

vadd_w$n4,$vz,$vx,$vy where vadd_w is a vector add instruction operating on 32-bit words, $n4 is the vector length register, $vx,$vy are the input vector registers containing values of ivec4 x and y, and vz is the target vector register that will contain values of ivec4 z. The vector length register $n4 may store a length value that matches the number of scalar data elements in the composite value. For ivec4 data type, $n4 may store a value of four representing for elements. For other types of composite data values, $n4 may store a different value. Thus, a variable-length vector instruction may be constructed using the vector length register $n4.

In some situations, the vector instruction may operations on mixed types of data elements including both scalar values and composite values. Consider the following example,

```
ivec4 x,y,z;
int a,b,c;
FOR-ALL-ITEMS
    z = x + y
    a = b + c
```

One solution is to parallelize the operations using two different lengths, one length being the same as the number of items, and one length being four times the length of the number of items. The converted form would be vadd_w $n4, $vz, $vx, $vy
vadd_w $n, $vc, $va, $vb This may be similarly applicable to masked vector instruction execution. Consider the case where a scalar operation is used to compute a mask for an ivec4 operation as follows:

```
ivec4 x,y,z;
int b,c;
FOR-ALL-ITEMS
    if( b > c )
        z = x + y
``` where the scalar values b and c are used as conditions for masking ivec4 values x and y. The following simple implementations of the conversion sequence is incorrect:
vcmp_eq $n, $m, $vz, $v0
vaddm_w $n4, $vz, $vx, $vy This is incorrect because the execution of vcmp_eq produces a single bit for each item, but that bit needs to control 4 positions in the vaddm_w of the ivec4. In one implementation, the mask may be expanded by replicating each bit 4 times. The following sequence introduce an instruction that expands the mask by 4 times.

```
vcmp_eq     $n,$m,$vz,$v0
vexpm_4     $n,$m,$m
vaddm_w     $n4,$vz,$vx,$vy
```

The instruction vexpm_N $n,$ma,$mb may expand $mb 4 times and store the expanded values in $ma. The semantics for vexpm_4 is as follows:

```
for( i = 0; i < $n; i++ )
    for( j = 0; j < N; j++ )
        $ma[N*i+j] = $mb[i]
```

In another implementation, the integer value N (i.e., the expansion factor) may be specified through a length register, rather than being encoded in the instruction.

In some situations, both scalar and vector operations may need to be masked as illustrated in the following example:

```
ivec4 x,y,z;
int b,c;
FOR-ALL-ITEMS
    if( b > c )
        z = x + y
        a = b - c
```

Expansion of the mask register may not be correct for the scalar integer operations although it is correct for the ivec4 operations. This can be resolved by performing the scalar operations prior to the expansion of the mask register as follows:

```
vcmp_eq     $n,$m,$vz,$v0
vsubm_w     $n,$vc,$va,$vb
vexpm_4     $n,$m
vaddm_w     $n4,$vz,$vx,$vy
```

With this ordering, the subtract is done before the mask is expanded using the correct mask.

Implementations of the disclosure may encode the composite types as part of the instruction, multiply the number of elements in the composite value by a value stored in a length register ($n) to specify the length of the vector, expand each mask bit by the number of elements of the composite type.

One implementation may use suffix_xN in vector instructions to indicate that the instruction is operating on com-posites of length N. Thus vadd_w_x4 is an addition of 4 element composites, i.e. ivec4. A vadd_w_x2 can represent a two-element composite, i.e. ivec2. The implementation may use _x1 to indicate scalars (i.e. treating scalars as though they were composites with one element).

By explicitly encoding the composite type in the instruction, the example

```
ivec4 x,y,z;
int b,c;
FOR-ALL-ITEMS
    if( b > c )
        z = x + y
        a = b - c
``` can be written directly as:

```
vcmp_eq_x1      $n,$m,$vz,$v0
vaddm_w_x4      $n,$vz,$vx,$vy
vsubm_w_x1      $n,$vc,$va,$vb
```

As such, there is no need to multiply the length by 4 (i.e. n4), nor need to add an instruction to expand the mask register.

In certain situations, the length of a vector defined in the instruction set architecture may not be sufficient to hold all the data elements. For example, in the context of GPU/GPGPU, when the number of items available exceeds the vector length, the data items can be broken up into separate groups; each group is responsible for handling a sub-set of all the items. The group length (i.e. the number of items handled by the group) may be selected to match the vector length so as to make most efficient use of the available hardware.

In the case of a loop kernel operating on a mixture of scalar and composite types of values using vectors with encoded composite types, there are two options to select the group length. The group length can be selected to enable the composite type data items to fit the vector length. Alternatively, the group length can be selected to enable the scalar data items to fit the vector length. For example, assuming that the vector length is 64 and that the composite types to be operated on are ivec4 type. Thus, each composite value may occupy four vector positions, and the scalar values are of integers (int type). If the group length is selected based on the number of composite values, the group length is 64/4=16. For a vector containing integer scalar values, only 16 elements of the vector are used while the other 48 positions are wasted. However, if the group length is selected based on the number of scalar values, the vector containing composite type data items may not fit in a single vector register or operation. This problem can be solved by splitting the composite data values among different registers and using N operations to compute, where N is the number of data items in a composite data type. For ivec4 composite data type, the following is a splitting example:

```
n = 64
n_4 = 16
vaddm_w_x4 $n_4,$vz[0:15],$vx[0:15],$vy[0:15]
vaddm_w_x4 $n_4,$vz[16:31],$vx[16:31],$vy[16:31]
vaddm_w_x4 $n_4,$vz[32:47],$vx[32:47],$vy[32:47]
vaddm_w_x4 $n_4,$vz[48:63],$vx[48:63],$vy[48:63]
vsubm_w_x1 $n,$vc,$va,$vb
```

Although this partially solves the problem, the execution mask is not properly set. The second vaddm_w_x4, for instance, should use bits 16 through 31 of the mask. There are two approaches to solving this problem.

In one implementation, the active bit of the mask may be repositioned by encoding the position of the active mask bits in the instruction. This can either be a direct encoding (i.e. specifying that the instruction will start at bit M) or a change in the position (i.e. specifying that the instruction will modify the previous start by M). Another implementation may include a separate instruction that repositions the active mask bits, either by specifying the new value, or by specifying the delta. A new mask may be set by selecting a bit range. For this purpose, implementation of the instruction set architecture may include an instruction vselm $na,$ma, $mb,$nb. The semantics of this instruction are

```
for( i = 0; i < $na; i++ )
    $ma[i] = $mb[i+$nb]
```

Example 1 of the disclosure is a processor comprising a register file comprising a length register, a vector register file comprising a plurality of vector registers, a mask register file comprising a plurality of mask registers, and a vector instruction execution circuit, communicatively coupled to the register file, the vector file, and the mask register file, to execute a first masked vector instruction comprising a first length register identifier representing the length register, a first vector register identifier representing a first vector register of the vector register file, and a first mask register identifier representing a first mask register of the mask register file, in which the length register is to store a length value representing a number of operations to be applied to data elements stored in the first vector register, the first mask register is to store a plurality of mask bits, and, a first mask bit of the plurality of mask bits determines whether a corresponding first one of the operations causes an effect.

Example 2 is a processor including a register file comprising a length register, a mask register file comprising a plurality of mask registers, and a vector instruction execution circuit, communicatively coupled to the register file and the mask register file, to execute a masked vector instruction comprising a first length register identifier representing the length register, a first mask register identifier representing a first mask register, and a second mask register identifier representing a second mask register, in which the length register is to store a length value representing a number of operations that are applied to a plurality of mask bits in the second mask register, and wherein the vector instruction execution circuit is to store results of the number operations in the first mask vector register.

Example 3 is a processor including a mask register file comprising a plurality of mask registers, and a vector instruction execution circuit, communicatively coupled to the mask register file, to execute a masked vector instruction comprising at least one source mask register identifiers representing at least one source mask register of the mask register file, at least two destination mask register identifiers representing at least two destination mask registers of the mask register file, and a reference to an operator, in which the vector instruction execution circuit is to execute the masked vector instruction to apply the operator on at least one source mask stored in the at least one source mask register to generate a result mask, and store the result mask in each of the at least two destination mask registers.

Example 4 is a processor including a mask register file comprising a plurality of mask registers, and a vector instruction execution circuit, communicatively coupled to the mask register file, to execute a masked vector instruction comprising at least one source mask register identifiers representing at least one source mask register of the mask register file, a destination mask register identifier representing a destination mask register of the mask register file, and a reference to an operator, in which the vector instruction execution circuit is to execute the masked vector instruction to apply the operator on at least one source mask stored in the at least one source mask register to generate a result mask, and store the result mask in the destination mask register and in a reserved mask register of the mask register file, wherein the reserved mask register is invoked without express reference to the reserved mask register in the masked vector instruction.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

APPENDIX A

| | | Mask registers | | | | | | | Stack of generated masks | Current final mask register | Stack of final masks |
|---|---|---|---|---|---|---|---|---|---|---|---|
| | | Reserved | Generated mask registers | | | | Final mask registers | | | | |
| ID | Code | M0 | M1 | M2 | M3 | M4 | M5 | M6 | M7 | | | |
| IF1 | base code if val < t1 | | r1 | | | | | | | M1 | | |
| | body IF1 | M1 (r1) | | | | | | | | | M1 | |
| IF2 | if val < t2 | | | r2 | | | | | | M2, M1 | | M1 |
| | body IF2 | M1 & M2 (r1 & r2) | | | | | M1 & M2 (r1 & r2) | | | | M5 | |
| IF3 | if val < t3 | | | | r3 | | | | | M3, M2, M1 | | M5, M1 |
| | body IF3 | M5 & M3 (r1 & 2 & r3) | | | | | | M5 & M3 (r1 & r2 & r3) | | | M6 | |
| ELSE3 | else | | | | | !r3 | | | | M3, M2, M1 | | M5, M1 |
| | body ELSE3 | M5 & M3 (r1 & 2 & !r3) | | | | | | M5 & M3 (r1 & r2 & !r3) | | | M6 | |

APPENDIX A-continued

| | | | | | | | | |
|---|---|---|---|---|---|---|---|---|
| IF4 | if val < t4 | | | r4 | | | M4, M3, M2, M1 | M6, M5, M1 |
| | body IF4 | M6 & M4 (r1 & 2 & !r3 & r4) | | | | M6 & M4 (r1 & r2 & !r3 & r4) | | M7 |
| ELSE4 | Else | | | !r4 | | | M4, M3, M2, M1 | M6, M5, M1 |
| | body ELSE4 | M6 & M4 (r1 & r2 & !r3 & !r4) | | | | M6 & M4 (r1 & r2 & !r3 & !r4) | | M7 |
| END4 | Endif | | | | | | M3, M2, M1 | M5, M1 |
| | body ELSE3 | M5 & M3 (r1 & r2 & !r3) | | | | M5 & M3 (r1 & r2 & !r3) | | M6 |
| END3 | Endif | | | | | | | |
| | body IF2 | M1 & M2 (r1 & r2) | | | M1 & M2 (r1 & r2) | | M2, M1 | M1 |
| ELSE2 | else | | !r2 | | | | M2, M1 | M1 |
| | body ELSE2 | M1 & M2 (r1 & r2) | | | M1 & M2 (r1 & !r2) | | | M5 |
| END2 | endif | | | | | | M1 | |
| | body IF1 | M1 (r1) | | | | | | M1 |
| IF5 | if val < t5 | | | r5 | | | M2, M1 | M1 |
| | body IF4 | M1 & M2 (r1 & r5) | | | M1 & M2 (r1 & r5) | | | M5 |
| ELSE5 | else | | !r5 | | | | M2, M1 | M1 |
| | body ELSE4 | M1 & M2 (r1 & !r5) | | | M1 & M2 (r1 & !r5) | | | M5 |
| END5 | endif | | | | | | M1 | |
| | body IF1 | M1 (r1) | | | | | | M1 |
| ELSE1 | else | | !r1 | | | | M1 | |
| | body ELSE1 | M1 (!r1) | | | | | | M1 |
| IF6 | if val > t1 | | | r6 | | | M2, M1 | M1 |
| | body IF5 | M1 & M2 (!r1 & r6) | | | M1 & M2 (!r1 & r6) | | | M5 |
| ELSE6 | else | | !r6 | | | | M2, M1 | M1 |
| | body ELSE5 | M1 & M2 (!r1 & !r6) | | | M1 & M2 (!r1 & !r6) | | | M5 |
| END6 | endif | | | | | | M1 | |
| | body ELSE1 | M1 (!r1) | | | | | | M1 |
| END1 | endif | | | | | | | |

Step description

Assign new "generated mask register" and push into "Stack of generated masks" (M1). If "current final mask register" is empty, no push into "stack of final masks"

If "stack of final masks" is empty, M0 = head of "stack of generated masks"(M1), "current final mask register" = M1

Assign new "generated mask register" and push into "Stack of generated masks" (M2). Push "current final mask register" into "stack of final masks"

Assign new unused "current final mask register" (M5). M0, M5 = head of "stack of generated masks" (M2) & head of "stack of final masks" (M1)

Assign new "generated mask register" and push into "Stack of generated masks" (M3). Push "current final mask register" into "stack of final masks"

Assign new unused "current final mask register" (M6). M0, M6 = head of "stack of generated masks" (M3) & head of "stack of final masks" (M5)

Negate the value in the register at the top of "stack of generated masks" (M3)

Re-use the "current final mask register". M0, M6 = head of "stack of generated masks" (M3) & head of "stack of final masks" (M5)

Assign new "generated mask register" and push into "Stack of generated masks" (M4). Push "current final mask register" into "stack of final masks"

Assign new unused "current final mask register" (M7). M0, M7 = head of "stack of generated masks" (M4) & head of "stack of final masks" (M6)

Negate the value in the register at the top of "stack of generated masks" (M4)

Re-use the "current final mask register". M0, M7 = head of "stack of generated masks" (M4) & head of "stack of final masks" (M6)

Pop heads of "stack of final masks" (M6) and "stack of generated masks" (M4)

Assign new unused "current final mask register" (M6). M0, M6 = head of "stack of generated masks" (M3) & head of "stack of final masks" (M5)

Pop heads of "stack of final masks" (M5) and "stack of generated masks" (M3)

Assign new unused "current final mask register" (M5). M0, M5 = head of "stack of generated masks" (M2) & head of "stack of final masks" (M1)

Negate the value in the register at the top of "stack of generated masks" (M2)

Re-use the "current final mask register". M0, M5 = head of "stack of generated masks" (M2) & head of "stack of final masks" (M1)

APPENDIX A-continued

Pop heads of "stack of final masks" (M1) and "stack of generated masks" (M2)
If "stack of final masks" is empty, M0 = head of "stack of generated masks"(M1), "current final mask register" = M1
Assign new "generated mask register" and push into "Stack of generated masks" (M2). Push "current final mask register" into "stack of final masks"
Assign new unused "current final mask register" (M5). M0, M5 = head of "stack of generated masks" (M2) & head of "stack of final masks" (M1)
Negate the value in the register at the top of "stack of generated masks" (M2)
Re-use the "current final mask register". M0, M5 = head of "stack of generated masks" (M2) & head of "stack of final masks" (M1)
Pop heads of "stack of final masks" (M1) and "stack of generated masks" (M2)
If "stack of final masks" is empty, M0 = head of "stack of generated masks"(M1), "current final mask register" = M1
Negate the value in the register at the top of "stack of generated masks" (M1)
If "stack of final masks" is empty, M0 = head of "stack of generated masks"(M1), "current final mask register" = M1
Assign new "generated mask register" and push into "Stack of generated masks" (M2). Push "current final mask register" into "stack of final masks"
Assign new unused "current final mask register" (M5). M0, M5 = head of "stack of generated masks" (M2) & head of "stack of final masks" (M1)
Negate the value in the register at the top of "stack of generated masks" (M2)
Re-use the "current final mask register". M0, M5 = head of "stack of generated masks" (M2) & head of "stack of final masks" (M1)
aa Pop heads of "stack of final masks" (M1) and "stack of generated masks" (M2)
If "stack of final masks" is empty, M0 = head of "stack of generated masks"(M1), "current final mask register" = M1
Pop heads of
"stack of final masks" (M1) and "stack of generated masks" (M2)

What is claimed is:

1. A processor, comprising:
a register file comprising a length register;
a vector register file comprising a plurality of vector registers;
a mask register file comprising a plurality of mask registers; and
a vector instruction execution circuit, communicatively coupled to the register file, the vector file, and the mask register file, to execute a first masked vector instruction comprising a first length register identifier representing the length register, a first vector register identifier representing a first vector register of the vector register file, and a first mask register identifier representing a first mask register of the mask register file, wherein
the length register is to store a length value representing a number of operations to be applied to data elements stored in the first vector register,
the first mask register is to store a plurality of mask bits, and
a first mask bit of the plurality of mask bits determines whether a corresponding first one of the operations causes an effect.

2. The processor of claim 1, wherein the first masked vector instruction is a masked variable-length vector instruction, wherein the number of operations is same as a number of the plurality of mask bits stored in the first mask register, and wherein each one of the plurality of mask bits is to control a corresponding one of the operations.

3. The processor of claim 1, wherein the first masked vector instruction is a masked variable-length vector instruction, wherein the number of operations is more than a number of the plurality of mask bits stored in the first mask register, and wherein each one of the plurality of mask bits controls a corresponding set of the operations.

4. The processor of claim 1, wherein the set of the operations are applied to a set data elements stored in a set of vector registers of the vector register file.

5. The processor of claim 1, wherein responsive to determining that the first mask bit is set, the vector instruction execution circuit is to at least one of:
prevent the first operation from generating an interrupt,
prevent the first operation from modifying content at a memory location responsive to determining that the first operation targets the memory location,
prevent the first operation from modifying a corresponding first data element of the first vector register responsive to determining that the first operation targets the first data element, or
prevent the first operation from modifying a corresponding second mask bit in a second mask register of the mask register file responsive to determining that the first operation targets the second mask bit in the second mask register.

6. The processor of claim 1, wherein responsive to determining that the first mask bit is unset, the vector instruction execution circuit is to allow application of the first operation on a corresponding data element in the first vector register.

7. The processor of claim 1, wherein the first masked vector instruction further comprising a second mask register identifier representing a second mask register to store the plurality of mask bits.

8. The processor of claim 1, wherein a second mask register is reserved for storing the plurality of mask bits.

9. The processor of claim 8, wherein the first masked vector instruction is to employ the second mask register implicitly without invoking an express second mask register identifier in the first masked vector instruction.

10. The processor of claim 9, wherein the vector instruction execution circuit is to execute a second masked vector instruction comprising a second length register identifier representing a second length register of the register file, a third mask register identifier representing a third mask register, a fourth mask register identifier representing a fourth mask register, a fifth mask register identifier representing a fifth mask register, and a reference to an operator, wherein execution of the second masked vector instruction comprises:
applying the operator on a first mask bit in the third mask register and a first mask bit in the fourth mask register;
setting a first mask bit of the fifth mask register based on a result by applying the operator; and
setting a first mask bit of the second mask register based on the result.

11. The processor of claim 1, wherein the first masked vector instruction is a compare-vector-registers-and-set mask-register instruction that further comprises a second vector register identifier representing a second vector register, and a reference to a comparison condition, and wherein execution of the compare-vector-registers-and-set mask-register instruction by the vector instruction execution circuit comprises:
 comparing, using the comparison operation, a first data element in the first vector register with a corresponding first data element in the second vector; and
 setting a first mask bit of the first mask register if a comparison result meets the comparison condition.

12. The processor of claim 1, wherein the first masked vector instruction further comprises a second vector register identifier representing a second vector register of the vector register file, and a third vector register identifier representing a third vector register of the vector register file, and wherein the vector instruction execution circuit is to execute the first masked vector instruction to apply the number of operations on data elements stored in the first vector register and the second vector register subject to the plurality of mask bits, and to store results of the operations in the third vector register.

13. A processor, comprising:
 a register file comprising a length register;
 a mask register file comprising a plurality of mask registers; and
 a vector instruction execution circuit, communicatively coupled to the register file and the mask register file, to execute a masked vector instruction comprising a first length register identifier representing the length register, a first mask register identifier representing a first mask register, and a second mask register identifier representing a second mask register,
 wherein the length register is to store a length value representing a number of operations that are applied to a plurality of mask bits in the second mask register, and wherein the vector instruction execution circuit is to store results of the number operations in the first mask vector register.

14. The processor of claim 13, wherein the masked vector instruction is a masked variable-length vector instruction, wherein the masked variable-length vector instruction is a mask manipulation instruction that further comprises a third mask register identifier representing a third mask register, and a reference to an operator, and wherein execution of the mask manipulation instruction by the vector instruction execution circuit comprises:
 applying the operator on a first mask bit in the second mask register and a first mask bit in the third mask register; and
 setting a first mask bit of the first mask register based on a result by applying the operator.

15. The processor of claim 14, wherein execution of the mask manipulation instruction by the vector instruction execution circuit further comprises:
 setting a first mask bit of a reserved mask register of the mask register file based on the result, wherein the reserved mask register is specified implicitly without an express identifier representing the reserved mask register in the masked vector instruction.

16. The processor of claim 13, wherein the masked vector instruction is a masked variable-length vector instruction, wherein the masked variable-length vector instruction is a mask manipulation instruction that further comprises a third mask register identifier representing a third mask register, and a reference to an operator, and wherein execution of the mask manipulation instruction by the vector instruction execution circuit comprises:
 applying the operator on a first mask bit in the second mask register and an inverted first mask bit in the third mask register; and
 setting a first mask bit of the first mask register based on a result by applying the operator.

17. The processor of claim 16, wherein execution of the mask manipulation instruction by the vector instruction execution circuit further comprises:
 setting a first mask bit of a reserved mask register of the mask register file based on the result, wherein the reserved mask register is specified implicitly without an express identifier representing the reserved mask register in the masked vector instruction.

18. The processor of claim 16, wherein the operator is one of a bit-wise AND operator or a bit-wise OR operator.

19. The processor of claim 13, wherein the masked vector instruction is a mask manipulation instruction that further comprises an expansion factor (N), and wherein execution of the mask manipulation instruction by the vector instruction execution circuit comprises:
 expanding a mask bit in the second mask register by repeating the mask bit N times; and
 storing the expanded mask bits in the first mask vector.

20. The processor of claim 13, wherein the number of operations is same as a number of the plurality of mask bits stored in the first mask register, and wherein each one of the plurality of mask bits is to control a corresponding one of the operations.

21. The processor of claim 13, wherein the number of operations is more than a number of the plurality of mask bits stored in the first mask register, and wherein each one of the plurality of mask bits controls a corresponding set of the operations.

22. A processor, comprising:
 a mask register file comprising a plurality of mask registers; and
 a vector instruction execution circuit, communicatively coupled to the mask register file, to execute a masked vector instruction comprising at least one source mask register identifiers representing at least one source mask register of the mask register file, at least two destination mask register identifiers representing at least two destination mask registers of the mask register file, and a reference to an operator,
 wherein the vector instruction execution circuit is to execute the masked vector instruction to:
  apply the operator on at least one source mask stored in the at least one source mask register to generate a result mask; and
  store the result mask in each of the at least two destination mask registers.

23. The processor of claim 22, wherein each of the at least one source mask comprises a plurality of mask bits, and wherein to apply the operator on at least one source mask stored in the at least one source mask register to generate a result mask, the vector instruction execution circuit is to apply the operator bit-wise on each of the plurality of mask bits of the at least source mask.

24. The processor of claim 22, wherein the at least one source mask register comprises two source mask registers, and the at least two destination mask register comprises two destination mask registers.

25. The processor of claim 22, wherein the masked vector instruction is a masked variable-length vector instruction further comprising a length register to store a number of operations applied to the at least one source mask register.

26. A processor, comprising:
- a mask register file comprising a plurality of mask registers; and
- a vector instruction execution circuit, communicatively coupled to the mask register file, to execute a masked vector instruction comprising at least one source mask register identifiers representing at least one source mask register of the mask register file, a destination mask register identifier representing a destination mask register of the mask register file, and a reference to an operator,
- wherein the vector instruction execution circuit is to execute the masked vector instruction to:
  - apply the operator on at least one source mask stored in the at least one source mask register to generate a result mask; and
  - store the result mask in the destination mask register and in a reserved mask register of the mask register file, wherein the reserved mask register is invoked without express reference to the reserved mask register in the masked vector instruction.

27. The processor of claim 26, wherein each of the at least one source mask comprises a plurality of mask bits, and wherein to apply the operator on at least one source mask stored in the at least one source mask register to generate a result mask, the vector instruction execution circuit is to apply the operator bit-wise on each of the plurality of mask bits of the at least source mask.

28. The processor of claim 26, wherein the masked vector instruction is a masked variable-length vector instruction further comprising a length register to store a number of operations applied to the at least one source mask register.

* * * * *